016c# United States Patent [19]

Matlack et al.

[11] Patent Number: 4,812,543

[45] Date of Patent: Mar. 14, 1989

[54] CO-POLYMER-BOUND AMINE ANTIOXIDANTS

[75] Inventors: Albert S. Matlack, Hockessin; Martin J. Paisner, Wilmington, both of Del.

[73] Assignee: Hercules Incorporated, Wilmington, Del.

[21] Appl. No.: 162,446

[22] Filed: Mar. 1, 1988

[51] Int. Cl.$^4$ ............................................. C08F 10/14
[52] U.S. Cl. ..................................... 526/281; 564/460; 564/80; 564/431; 564/440; 564/443; 560/120

[58] Field of Search .................. 526/281; 564/460, 80, 564/431, 440, 443; 560/120

Primary Examiner—Paul R. Michl
Assistant Examiner—Alex H. Walker
Attorney, Agent, or Firm—William S. Alexander

[57] ABSTRACT

A novel metathesis catalyst polymerizable composition is provided which comprises at least one ring-opening metathesis catalyst polymerizable norbornene-type monomer and at least one ring-opening metathesis catalyst polymerizable amine antioxidant comonomer.

4 Claims, No Drawings

CO-POLYMER-BOUND AMINE ANTIOXIDANTS

BACKGROUND OF THE INVENTION

Polycycloolefin monomers, such as dicyclopentadienes, dihydrodicyclopentadienes, norbornenes, norbornadienes and other norbornene-type monomers are known to undergo ring-opening polymerization reactions in the presence of a metathesis catalyst to form high modulus, high impact strength polyunsaturated hydrocarbon polymers. For example, U.S. Pat. No. 4,400,340 describes the production of a poly(dicyclopentadiene) (PDCP) from metathesis catalyst ring-opening polymerization of dicyclopentadiene. Similarly, U.S. Pat. Nos. 4,568,660 and 4,689,380 describe metathesis catalyst ring-opening copolymerization of dicyclopentadiene with such norbornene-type monomers as 1,4,5,8-dimethano-1,4,4a,5,8,8a-hexahydronaphthalene (DMHN) and 1,4,5,8-dimethano-1,4,4a,5,8,8a-octahydronaphthalene (DMON); U.S. Pat. No. 4,703,098 describes copolymers prepared from ring-opening metathesis catalyst copolymerization of dicyclopentadiene with dicyclopentadiene oligomers such as tricyclopentadiene and higher oligomers; and U.S. Pat. No. 4,701,510 describes preparation by ring-opening metathesis catalysis of polymers of DMON and norbornene and copolymers and terpolymers of such monomers with other norbornene-type monomers such as dicyclopentadiene, tricyclopentadiene and higher dicyclopentadiene oligomers.

Such polymeric materials, however, due to the presence of significant amounts of carbon-carbon unsaturation can be subject to degradation of their physical properties such as tensile elongation, structural integrity, modulus and impact strength by olefin oxidation on exposure to light, heat and/or air over periods of time. Thus it has been proposed to incorporate into such polymers sterically hindered phenolic or amine antioxidant compounds such as 2,6-ditertiarybutyl-paracresol and N,N'-diphenyl-1,4-phenylene diamine as stabilizers to delay such olefin oxidation. See, for example, U.S. Pat. No. 4,507,453. Amine compounds are preferred for use as antioxidants as they have been found to afford much better protection than other compounds against the loss of physical properties by olefin oxidation. Unfortunately, however, the use of such amine compounds has been limited due to their tendency to "bleed" or migrate to the surface of the polymer thereby causing polymer discoloration and also staining of painted surfaces by further migration through the paint film.

It is an object of this invention, therefore, to provide an antioxidant stabilizing system for polymers formed from ring-opening metathesis catalyst polymerization of polycycloolefin monomers such as dicyclopentadienes, tricyclopentadienes (and higher oligomers of dicyclopentadiene), norbornenes, norbornadienes, DMON, DMHN and other norbornene-type monomers, and copolymers and terpolymers formed from ring-opening copolymerization of mixtures of such monomers which effectively delays degradation by olefin oxidation of such of the polymers physical properties as mentioned above. It is a further object of this invention to provide such an antioxidant stabilizing system which does not cause discoloration of such polymers when incorporated therein, and does not cause discoloration of any paint systems which have been applied to such polymers for aesthetic purposes.

DETAILED DESCRIPTION OF THE INVENTION

In accordance with this invention novel ring-opening metathesis catalyst copolymerizable antioxidant stabilizing compounds are provided which, when incorporated into polyunsaturated hydrocarbon polymeric material, significantly delay degradation of physical properties of the polymer on exposure to light, heat and/or air, and which further have greatly reduced tendency to bleed and cause polymer discoloration. Accordingly, this invention provides a composition comprising at least one ring-opening metathesis catalyst polymerizable norbornene-type monomer and at least one ring-opening metathesis catalyst polymerizable amine antioxidant comonomer having the following general formula:

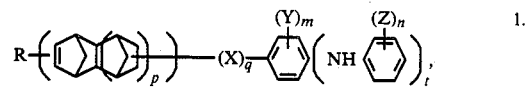

where R represents hydrogen, halogen, haloalkyl, cyano, a straight-chain or branched $C_1$ to $C_{20}$-alkyl group, $C_2$ to $C_{20}$-alkenyl group, $C_7$ to $C_{20}$-aralkyl group, $C_7$ to $C_{20}$-aralkenyl group, —OR', —OCOR', R', —SCOR', —OCSR', —SO$_2$R', —SiR'$_3$, —NHR', —NR'$_2$, —CONR'$_2$, OP(OR')$_2$, or

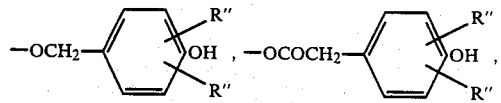

groups in which R' denotes a hydrogen, straight-chain or branched $C_1$ to $C_{20}$-alkyl group, $C_2$ to $C_{20}$-alkenyl group, $C_7$ to $C_{20}$-aralkyl group, or $C_7$ to $C_{20}$-aralkenyl group, and if there are two or more radicals represented by R' they may be identical or different from each other, phenyl radicals or substituted phenyl radicals having one or more different substituents selected from the group defined by R' herein, and where R" denotes a branched $C_1$ to $C_{20}$-alkyl or $C_2$ to $C_{20}$-alkenyl group, and where X represents a direct bond or a multivalent organic radical selected from a straight-chain or branched $C_1$ to $C_{20}$-alkyl group, C to $C_{20}$-alkenyl group, $C_7$ to $C_{20}$-aralkyl group, $C_7$ to $C_{20}$-aralkenyl group, or —OR'—,

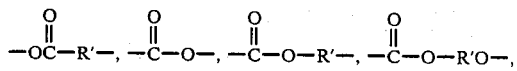

—NH$_2$—, —R'—NH—, —Ph—R'—NH—, —Ph—R'—O—, —SO$_2$—, —SO$_2$—R'—O—, —SO$_2$R'NH—, groups in which R' represents a straight chain or branched $C_1$ to $C_{20}$-alkyl group, $C_1$ to $C_{20}$-alkenyl group, $C_7$ to $C_{20}$-aralkyl group, or $C_7$ to $C_{20}$-aralkenyl group, and where y and z are defined as R' above or represent a radical having the formula:

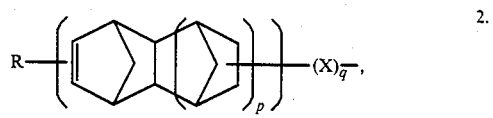

where R and X are defined as above, and in which P is an integer from 0 to 2, and q is a positive integer or 0, and m is an integer from 0 to 4, and n is an integer from 0 to 5, and t is a positive integer from 1 to 2.

Any of the various ring-opening metathesis catalyst polymerizable norbornene-type monomers known in the art are useful as comonomers in this invention. For example, such polymerizable monomers useful herein include norbornenes, norbornadienes, dicyclopentadienes and symmetrical and unsymmetrical trimers and higher oligomers thereof, 1,4,5,8-dimethano-1,4,4a,5,8,8a-octahydronaphthalene, (tetracyclododecene), and 1,4,5,8-dimethano-1,4,4a,5,8,8a-hexahydronaphyhalene (tetracyclododecadiene), all of which are described, for example, in U.S. Pat. Nos. 4,689,380; 4,568,660; 4,380,617; 4,703,098; and 4,701,510 as set forth above. Such monomers can be used alone or in combinations of two or more in accordance with the present invention.

Other such polymerizable monomers useful herein include $C_4$ to $C_{12}$ monocyclo, mono- and di-olefin compounds which can be optionally substituted by $C_1$ to $C_{20}$-alkyl, -alkenyl, -aralkyl, or -aralkenyl groups, specific examples of which are cyclopentene, cyclobutene and cycloheptene.

Monomers which are preferred in this invention include unsubstituted and substituted derivatives of dicyclopentadiene, and their corresponding trimers and higher oligomers.

Polymerizable amine antioxidant comonomers which are preferred in this invention include compounds having the following general formula:

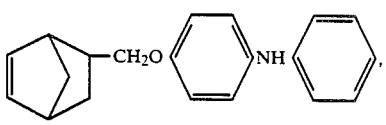

3.

in which R, X, q and t all have the same meanings, respectively, as set forth above. The following examples illustrate the preparation of such preferred compounds.

EXAMPLE 1

Preparation of N-(norborn-5-en-2-ylmethyl)-N'-phenyl 1,4-phenylenediamine which has the following structural formula:

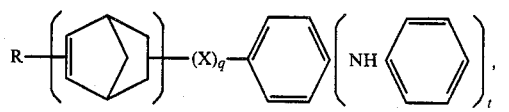

4.

A solution of 15.66 grams (0.10 mole) of 5-norbornene-2-carbonyl chloride in 50 milliliters of ethyl ether is added dropwise while stirring under nitrogen to a solution of 18.42 grams (0.10 mole) N-phenyl-1,4-phenylenediamine and 10.62 grams (0.105 mole) triethylamine in 100 milliliters ethyl ether at 5° to 10° C. over a period of about 30 minutes. Stirring is continued for six hours. After three hours of such stirring, another 50 milliliters of ether is added. After sitting overnight, the mixture is stirred with 150 milliliters water, and solids which are present are washed twice with ether followed by washing with aqueous sodium bicarbonate, then dissolved in methylene chloride and washed twice again with water. After drying over magnesium sulfate, the solvent is removed from the methylene chloride layer leaving a solid which is extracted three times with ethyl ether. Upon drying and recrystallization from toluene under nitrogen, 12.5 grams (41%) of light-grey needles are obtained, which have a melting point of 148.8° C. The thus formed amide compound is then reduced in the presence of lithium aluminum hydride in tetrahydrofuran. After recrystallization from hexane under nitrogen followed by successive recrystallizations from 95% ethanol, nearly colorless crystals are obtained (total yield of 53%) having a melting point ranging from 79.5° to 81.2° C.

EXAMPLE 2

Preparation of 4-(norborn-5-en-2-ylmethoxy)diphenylamine, which has the following structural formula:

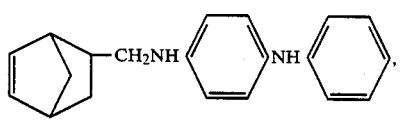

5.

A solution of 6.76 grams (0.294 gram-atom) of sodium dissolved in 100 milliliters of ethanol (prepared over 3A molecular sieves) under nitrogen is combined with 54.4 grams (0.294 mole) of 4-hydroxy-diphenylamine and 1.32 grams (8.8 millimole) sodium iodide which have been ground to pass a 100 mesh sieve, in a pop bottle with a self-sealing rubber liner. After a solution is obtained by heating on a steam bath under nitrogen, 41.9 grams (0.294 mole) of norborn-5-en-2-ylmethyl chloride is added by cannula. The mixture is heated overnight with stirring at 160° to 170° C., then cooled and washed in a mixture of ethyl ether and 10% aqueous sodium hydroxide. The organic layer is washed three more times with 10% aqueous sodium hydroxide followed by two successive washings with water. The combined aqueous layers are next washed three more times with ethyl ether. The solid remaining after removal of the solvent from the combined ethyl ether extracts is recrystallized from boiling 95% ethanol under nitrogen to yield 29.5 grams (34%) of crystals having a melting point of 81.2° C.

EXAMPLE 3

Preparation of 4-(3-chloromethyl-norborn-5-en-2-ylmethoxy)diphenylamine, which compound has the following structural formula:

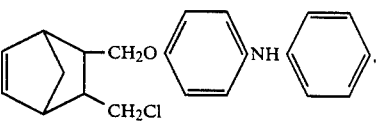

6.

To a solution of 3.46 grams (0.15 gram-atom) sodium in 150 milliliters anhydrous ethanol is added 27.8 grams (0.15 mole) 4-hydroxy-diphenylamine under nitrogen with stirring until dissolution. Next, 7.5 grams (0.039 mole) 5,6-bis(chloromethyl)-norborn-2-ene is added, and the mixture then heated at reflux for four days. After treatment with charcoal, the solvent is removed, followed by flash chromatography on silica gel in toluene and subsequent solvent removal and heating at 175° C./0.55 mm with nitrogen sparge to remove unreacted starting chloride to poduce 3.1 grams (23%) of resinous product.

EXAMPLE 4

Preparation of 4-anilinophenyl norborn-5-en-2-carboxylate, which compound has the following structural formula:

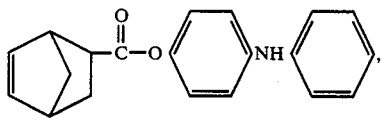  7.

A solution of 13.63 grams (0.087 mole)4-norbornene-2-carbonyl chloride in 35 milliliters ethyl ether is added dropwise while stirring under nitrogen to a solution of 10.70 grams (0.058 mole) 4-hydroxy-diphenylamine and 9.66 grams (0.095 mole) triethylamine in 65 milliliters ethyl ether at 2° to 5° C. over a period of 30 minutes. Stirring is continued while cooling the two combined solutions in an ice bath for approximately four hours. The mixture is then washed three times with ice-cold 5% aqueous sodium hydroxide. After treatment with a combination of anhydrous magnesium sulfate and charcoal, the solvent is removed from the organic layer to leave 19.5 grams of resin. Flash chromatography of 15.7 grams of the resin on silica gel in toluene yields 4.25 grams (24%) of slightly tan crystals, having a melting point range from 49° to 50° C.

EXAMPLE 5

Preparation of 4-(9-(norborn-5-en-2-yl)nonyloxy)-diphenylamine, which compound has the following structural formula:

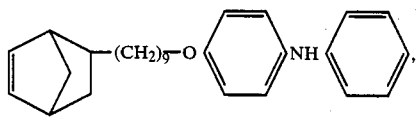  8.

A mixture of 35.0 grams (0.15 mole) undecylenyl bromide, 9.9 grams (0.075 mole) dicyclopentadiene and 0.22 grams 2,6-di-tert-butyl-4-methylphenol in a pop bottle with a self-sealing lid is heated under nitrogen at 200° C. for 24 hours, then at 220° C. for an additional 24 hours. The 1:1 adduct is then isolated from unreacted starting components by fractional distillation, as identified by capillary gas chromatography. Next, 5.18 grams (0.028 mole) of 4-hydroxyldiphenyl amine is added to a solution of sodium (0.65 grams) and potassium iodide (0.10 gram) in 40 milliliters anhydrous ethanol under nitrogen. After dissolution, 7.56 grams of the 1:1 adduct isolated above is added to the solution, and the mixture is heated at reflux for 24 hours, after which it is filtered, and the solvent evaporated. A solution of the resulting residue in ethyl ether is then washed twice with 5% aqueous sodium hydroxide and once with water. After drying the organic layer over magnesium sulfate, it is stripped of solvent leaving 9.63 grams of residue which is then dissolved in toluene for passage through a column of neutral alumina to yield after removal of toluene, 7.37 grams of a viscous, slightly tan liquid.

EXAMPLE 6

Preparation of 11-(4-anilinophenoxy)undecyl norborn-5-en-2-carboxylate, a compound having the following structural formula:

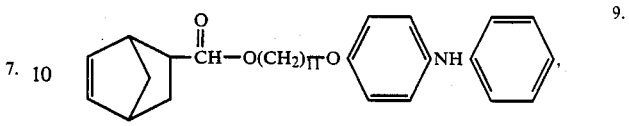  9.

To a stirred solution of 1.15 grams (0.05 gram-atom) sodium and 0.10 grams potassium iodide in 50 milliliters anhydrous ethanol under nitrogen is added 9.25 grams (0.05 mole) of 4-hydroxy-diphenylamine. After dissolution, 12.06 grams (0.05 mole) 11-bromo-1-undecanol is added to the solution, and the mixture is heated at reflux for 24 hours. Filtration of the cooled mixture followed by successive recrystallizations from 95% ethanol under nitrogen gives 13.23 grams (75%) of a solid having a melting point of from 87.9° to 88.3° C. Next, a solution of 5.59 grams (0.036 mole) 5-norbornene-2-carbonyl chloride in 27 milliliters dry tetrahydrofuran is added dropwise with stirring under nitrogen to a solution of 12.23 grams (0.034 mole) of the intermediate amino alcohol prepared above and 3.82 grams triethylamine in 53 milliliters dry tetrahydrofuran at 0.5° C. over a period of 45 minutes. This treatment is repeated with an additional 2.80 grams of the acid chloride in 15 milliliters of ethyl ether and 1.91 grams triethylamine until the reaction is completed as indicated by thin layer chromatography (toluene on silica). Water is next added to the reaction mixture, and the aqueous layer extracted three times with ethyl ether. The combined ether layers are then extracted twice with 5% aqueous sodium hydroxide and one with water. After drying the ether layer over magnesium sulfate, the solvent is distilled off to leave a viscous liquid which is dissolved in toluene and passed through a column of neutral alumina. Removal of the toluene yields 8.83 grams (54%) of product.

EXAMPLE 7

Preparation of 4-anilinophenoxy-ethyl norborn-5-en-2-yl sulfone which has the following structural formula:

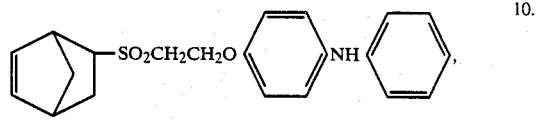  10.

A mixture of 9.2 grams (0.05 mole) 5-vinylsulfonyl-2-norbornene, 18.5 grams (0.10 mole) 4-hydroxy-diphenylamine, 2.0 grams (0.05 mole) sodium hydroxide and 200 milliliters of 50% aqueous ethanol is stirred for about 24 hours under nitrogen. A solid is removed after filtration which is then dissolved in methylene chloride, and extracted three times with 5% aqueous potassium hydroxide and once with water. After solvent removal followed by recrystallization from 95% ethanol under nitrogen, 10.66 grams (58%) of a solid is recovered having a melting point of 128.8° C.

EXAMPLE 8

Preparation of 4-anilinophenyl 4-(5-norbornyl)benzyl ether which compound has the following structural formula:

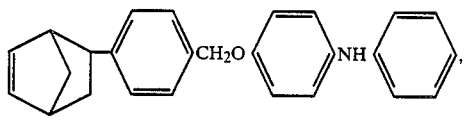

11.

A mixture of 99.0 grams (0.75 mole) dicyclopentadiene, 76.3 grams (0.05 mole) vinylbenzyl chloride and 0.75 grams 2,6-di-tert-butyl-4-methylphenol is heated at 150° C. for 20 hours under nitrogen in a pop bottle equipped with a self-sealing lid. The 1:1 adduct is removed from unreacted starting components by fractional distillation, as identified by capillary gas chromatography. Next, 9.25 grams (0.05 mole) 4-hydroxydiphenylamine is added to a solution of 3.30 grams potassium hydroxide (85%, 0.05 mole) in 75 milliliters of 95% ethanol. After dissolution, the solvent is removed, and 0.50 gram potassium iodide, 10.92 grams containing 0.016 mole of the 1:1 adduct prepared above, and 100 milliliters of 2-methoxyethyl ether are added to the solution, after which the mixture is stirred under nitrogen at 35° C. for approximately 48 hours. The reaction mixture is next added to 500 milliliters of water which is then extracted three times with ethyl ether. After the combined ether extracts are washed three times with 5% aqueous sodium hydroxide and once with water, drying is accomplished with magnesium sulfate followed by removal of solvent by distillation. Flash chromatography of the residue in toluene on silica gel results in recovery of 7.02 grams of residue containing 23% tricyclopentadiene and 68.5% of product, as determined by capillary gas chromatography.

EXAMPLE 9

Preparation of 4-(4-anilino)-anilino)phenyl norborn-5-en-2-carboxylate which compound has the following structural formula:

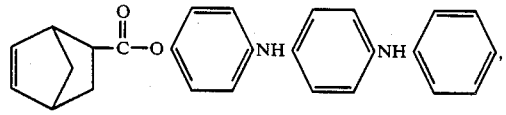

12.

A solution of 3.99 grams (0.026 mole) of 5-norbornene-2-carbonyl chloride in 30 milliliters ethyl ether is added dropwise with stirring under nitrogen to a solution of 4.70 grams (0.017 mole) 4-((4-anilino)anilino)phenol and 2.82 grams (0.028 mole) triethylamine in 300 milliliters ethyl ether at 0° to 5° C. The mixture is allowed to stir for a period of 24 hours, then heated to reflux for four hours, after which it is cooled, then washed 5 times with 5% aqueous sodium hydroxide and twice with water. After subsequent drying over magnesium sulfate, solvent is distilled off and flash chromatography of the resulting residue on silica gel in toluene produces product fractions which are combined for passage through a column of neutral alumina with elution with methylene chloride, then with ethyl ether. After removal of solvents from the combined eluates, the resulting solid residue is recrystallized from 95% ethanol hexane under nitrogen to yield 2.08 grams (32%) of crystals having a melting point of 122.8° C.

EXAMPLE 10

Preparation of 4-((4-anilino)anilino)phenyl norborn-5-en-2-ylmethyl ether, which compound has the following structural formula:

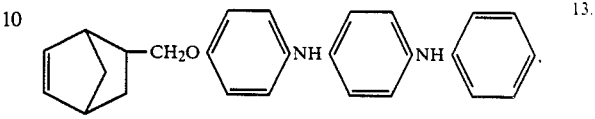

13.

To a solution of 0.39 gram (0.017 gram-atom) sodium and 0.10 gram potassium iodide in 20 milliliters of 1-butanol is added 4.70 grams (0.017 mole) 4-((4-anilino)anilino)phenol. The mixture is heated to 135° C., then cooled, and 2.42 grams (0.017 mole) of norborn-5-en-2-ylmethyl chloride is then added thereto, and the resulting mixture heated,for a period of 24 hours under nitrogen at 170° to 180° C. Ethyl ether and 10% aqueous sodium hydroxide are then added so as to form a solution, and the organic layer then extracted three times with water. The aqueous extracts are next extracted three times with ethyl ether, and solvent is then removed from the combined ethyl ether layers. Flash chromatography on silica gel in toluene-20% ethyl ether followed by successive recrystallization from 95% ethanol-hexane under nitrogen yields a product having a melting point range from 108° to 112.6° C.

In accordance with the present invention, the aforementioned norbornene-type monomers can undergo ring-opening metathesis catalyst copolymerization with the amine antioxidant comonomers in such a manner as to form copolymers, terpolymers and higher polymers having significantly reduced tendency of their physical properties such as structural integrity, modulus and impact strength to degrade on exposure to light, heat and/or air over periods of time. Thus formed polymeric materials also have significantly less tendency to become discolored or otherwise cause discoloration of paint systems applied thereto.

Ring-opening metathesis catalyst polymerization of the aforementioned copolymerizable compounds for purposes of this invention can be conducted by a variety of procedures and catalyst systems known in the art. For example, such metathesis catalyst polymerization can be carried out by substantially any technique known in the art for the preparation of dicyclopentadiene homopolymer. A preferred method for carrying out ring-opening metathesis polymerization of the aforementioned compounds is taught, for example, in U.S. Pat. No. 4,400,340. In such a process, known as reaction injection molding (RIM), a plurality of reactive liquid streams, usually two or three streams, comprising a two-part metathesis catalyst system are mixed together, the combined streams then being injected into a mold where they quickly set up into a solid polymerized mass.

One of these streams contains a metathesis catalyst component, preferably a tungsten halide or tungsten oxyhalide complex, dissolved in a norbornene-type monomer or mixture of such monomer nd polymerizable amine antioxidant comonomer. The mixture may, of course, contain more than one type of norbornene-type monomer and/or amine antioxidant comonomer.

Another stream contains an alkylaluminum activator component, preferably comprising an alkylaluminum iodide compound, and a reaction rate moderator to delay catalyst activation which are also dissolved in norbornene-type monomer or a monomer/amine antioxidant comonomer mixture. The streams are mixed together and immediately injected into a mold of the desired shape where the metathesis copolymerization take place. The reaction rate moderator delays the onset of the reaction for the time required to transfer the entire mixture into the mold, following which reaction can be substantially completed within about one-half minute or less.

Other compounds known to improve impact strength of polymers comprising repeating units derived from norbornene-type monomers, or copolymers and terpolymers comprising repeating units derived from mixtures of such monomers, can be incorporated into the copolymers of the present invention. For example, a hydrocarbon elastomer such as butyl rubber, polyisoprene, polybutadiene, polyisobutylene, styrene-butadiene block and random rubbers, ethylene-propylene copolymers and ethylene-propylene-diene terpolymers and the like can be formulated with the norbornene-type monomer and/or monomer/amine antioxidant comonomer mixtures contained in the reactive streams prior to metathesis copolymerization.

The total amount of amine antioxidant comonomer in the monomer/amine antioxidant comonomer mixture after all reactive streams are mixed together, in accordance with this invention, can vary from about 0.005 to about 20 parts by weight, preferably from about 0.5 to about 5 parts by weight per 100 parts norbornene-type monomer.

The following examples more fully illustrate the preparation of polymers from compositions comprising mixtures of norbornene-type monomer and amine antioxidant comonomer in accordance with this invention.

EXAMPLES 11-20

Copolymerization.

Copolymers are prepared from compositions comprising mixtures of polymerizable norbornene-type monomers and amine antioxidant comonomers according to the following procedure.

A metathesis catalyst-reactive stream is prepared by first preparing a 0.5 molar solution of tungsten complex by adding 100 grams of $WCl_6$ to 60 milliliters of dry toluene under a nitrogen atmosphere, following by the addition of a solution of 41 grams of para-tert-butylphenol in 30 milliliters or toluene. The catalyst solution is sparged for approximately 24 hours with nitrogen to remove traces of HCl, and 0.44 milliliter of same is then syringed into a nitrogen sparged airtight bottle containing 20 milliliters of dicyclopentadiene monomer.

A 1.0 molar activator-monomer stream is also prepared by first preparing an 85/15/10 molar ratio mixture of tri-N-octyl aluminum (tNOA), dioctylaluminum iodide (DOAI) and diethylene glycol dimethyl ether (diglyme) as a reaction rate moderator, respectively, then syringing 20 milliliters of the mixture into a nitrogen sparged airtight bottle containing 20 milliliters of dicyclopentadiene monomer.

Reactive streams comprising norbornene-type monomer and amine antioxidant comonomer are also prepared by mixing various amine antioxidant comonomers with 20 milliliter portions of dicyclopentadiene monomer in airtight bottles under a nitrogen atmosphere.

Copolymerization is then accomplished by simultaneously injecting two milliliters of each reactive stream prepared above into a common mixing vessel, after which the reaction mixture flows into a reaction vessel where a copolymer "plug" is produced, and which is then removed for testing. The total weight percent of indicated amine antioxidant comonomer in each example composition before copolymerization is set forth below in Table 1.

Oxidative stability of the resulting copolymers is determined using high pressure differential scanning calorimetry (PDSC). Such a technique is described, for example, in 91 Themochimica Acta 87-94 (1985), and in Proceedings of the 13th North American Thermal Analysis Society, Philadelphia, PA., p. 520 (1984). Using this technique, the time taken for a given sample to begin the process of autooxidation at a constant temperature, as exhibited by a sudden exothermic reaction, is measured. The results of such testing, as summarized in Table 1, illustrate the oxidative stability (PDSC induction time as a measure of minutes) of the copolymers achieved for a given mole percent of antioxidant compound copolymerized therein.

TABLE 1

| | | Antioxidant Efficacy | | |
| | | Antioxidant | | |
| Example No. | From Example No. | Weight Percent | Mole Percent | *PDSC (Minutes) |
| --- | --- | --- | --- | --- |
| 11 | 1 | 1.12 | 0.51 | 10 |
| 12 | 2 | 2.2 | 1.2 | 6.5 |
| 13 | 3 | 1.9 | 7.6 | 9.5 |
| 14 | 4 | 2.3 | 1.0 | 9.5 |
| 15 | 5 | 3.1 | 1.0 | 46 |
| 16 | 6 | 3.7 | 1.0 | 8 |
| 17 | 7 | 2.8 | 1.0 | 46.5 |
| 18 | 8 | 2.9 | 1.0 | 12 |
| 19 | 9 | 1.5 | 0.50 | 48.5 |
| 20 | 10 | 1.4 | 0.52 | 27 |
| 21 | — | 0 | 0 | 0 |

*130° C., 550 psi $O_2$

We claim:

1. A ring-opening metathesis catalyst polymerizable composition comprising:
   (a) at least one ring-opening metathesis catalyst polymerizable norbornene-type monomer, and
   (b) at least one ring-opening metathesis catalyst polymerizable amine antioxidant comonomer having the general formula:

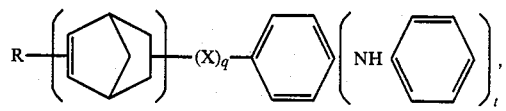

in which R represents hydrogen or a haloalkyl, and where X represents a direct bond or a multivalent organic radical selected from a straight-chain or branched $C_1$ to $C_{20}$-alkyl, $C_2$ to $C_{20}$-alkenyl, $C_7$ to $C_{20}$-aralkyl, $C_7$ to $C_{20}$-aralkenyl group, or —OR'—,

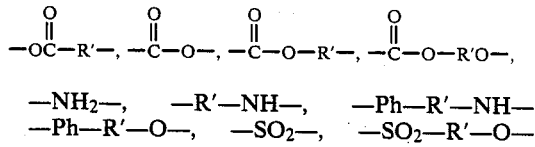

—SO₂R′NH—, groups in which R′ represents a straight chain or branched $C_1$ to $C_{20}$-alkyl, $C_2$ to $C_{20}$-alkenyl, $C_7$ to $C_{20}$-aralkyl, or $C_7$ to $C_{20}$-aralkenyl group, and where q is a positive integer or zero, and t is a positive integer from 1 to 2, wherein the amount of amine antioxidant comonomer from part (b) ranges from about 0.005 parts by weight to about 20 parts by weight per 100 parts polymerizable monomer from part (a).

2. The composition as claimed in claim 1 wherein the monomer in part (a) is selected from dicyclopentadiene, trimers and higher oligomers of dicyclopentadiene, norbornene, norbornadiene, and unsubstituted and substituted alkyl derivatives of tetracyclododecene and tetracyclododecadiene, and the amine antioxidant comonomer in part (b) is selected from
N-(norborn-5-en-2-ylmethyl)-N′-phenyl 1,4-phenylethylenediamine,
4-(norborn-5-en-2-ylmethoxy)diphenylamine,
4-(3-chloromethyl-norborn-5-en-2-ylmethoxy)diphenylamine,
4-anilinophenyl norborn-5-en-2-carboxylate,
4-(9-(norborn-5-en-2-yl)nonyloxy)-diphenylamine,
11-(4-anilinophenoxy)undecyl norborn-5-en-2-carboxylate,
4-anilinophenoxy-ethyl norborn-5-en-2-yl sulfone,
4-anilinophenyl 4-(5-norborn-2-yl)benzyl ether,
4-(4-anilino)anilino)phenyl norborn-5-en-2-carboxylate, and 4-((4-anilino)anilino)phenyl norborn-5-en-2-ylmethyl ether.

3. A polymeric composition of matter comprising a reaction product obtained by ring-opening metathesis catalyst polymerization of a norbornene-type monomer and from about 0.005 parts by weight to about 20 parts by weight per 100 parts norbornene-type monomer of an amine antioxidant comonomer having the general formula:

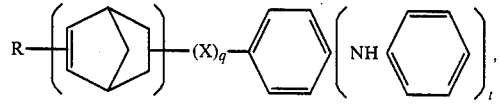

in which R represents hydrogen or a haloalkyl, and where X represents a direct bond or a multivalent organic radical selected from a straight-chain or branched $C_1$ to $C_{20}$-alkyl, $C_2$ to $C_{20}$-alkenyl, $C_7$ to $C_{20}$-aralkyl, $C_7$ to $C_{20}$-aralkenyl group or —OR′—,

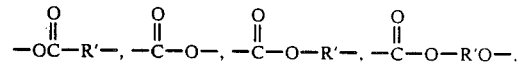

—NH₂—, —R′—NH—, —Ph—R′—NH—, —Ph—R′—O—, —SO₂—, —SO₂—R′—O—, —SO₂R′NH—, groups in which R′ represents a straight chain or branched $C_1$ to $C_{20}$-alkyl, $C_2$ to $C_{20}$-alkenyl, $C_7$ to $C_{20}$-aralkyl, or $C_7$ to $C_{20}$-aralkenyl group, and where q is a positive integer or zero, and t is a positive integer from 1 to 2.

4. A ring-opening metathesis catalyst polymerizable amine antioxidant comonomer having the general formula:

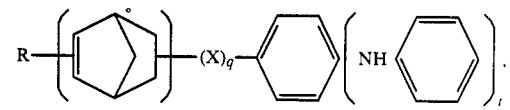

in which R represents hydrogen or a haloalkyl, and where X represents a direct bond or a multivalent organic radical selected from a straight-chain or branched $C_1$ to $C_{20}$-alkyl, $C_2$ to $C_{20}$-alkenyl, $C_7$ to $C_{20}$-aralkyl, $C_7$ to $C_{20}$-aralkenyl group or —OR′—,

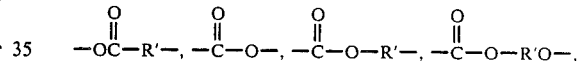

—NH₂—, —R′—NH—, —Ph—R′—NH—, —Ph—R′—O—, —SO₂—, —SO₂—R′—O—, —SO₂R′NH—, groups in which R′ represents a straight chain or branched $C_1$ to $C_{20}$-alkyl, $C_2$ to $C_{20}$-alkenyl, $C_7$ to $C_{20}$-aralkyl, or $C_7$ to $C_{20}$-aralkenyl group, and where q is a positive integer or zero, and t is a positive integer from 1 to 2.

* * * * *